Sept. 21, 1965   J. H. HOLMES   3,207,649
COLLAPSIBLE TIRE RETREADING RIM
Filed April 2, 1962   3 Sheets-Sheet 1

INVENTOR.
JACK H. HOLMES
BY
Teare, Fetzer + Teare
ATTORNEYS

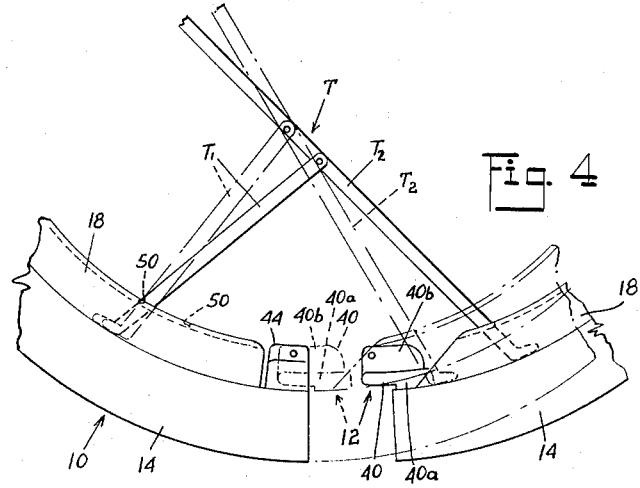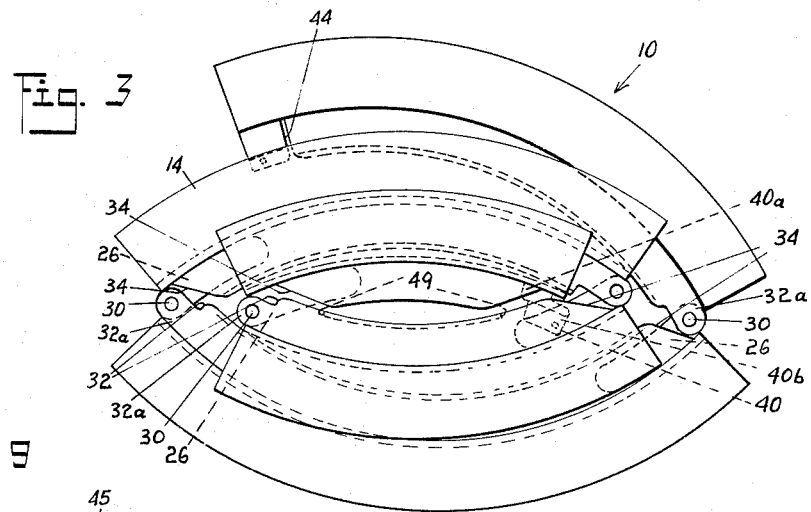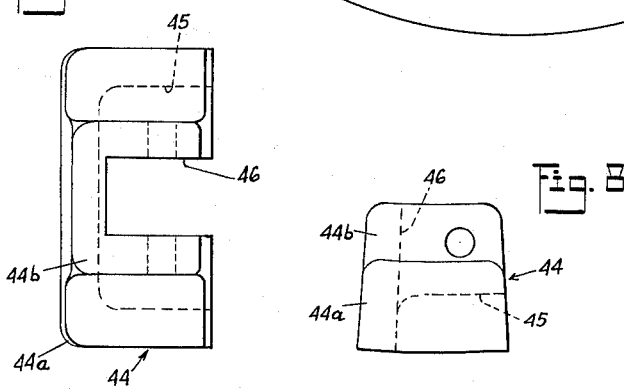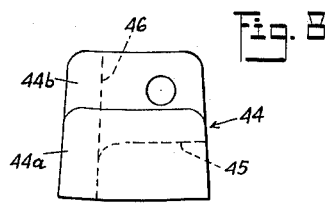
INVENTOR.
JACK H. HOLMES

Sept. 21, 1965 J. H. HOLMES 3,207,649
COLLAPSIBLE TIRE RETREADING RIM
Filed April 2, 1962 3 Sheets-Sheet 3

INVENTOR.
JACK H. HOLMES
BY
Teare, Tetzer & Teare
ATTORNEYS

United States Patent Office 3,207,649
Patented Sept. 21, 1965

3,207,649
COLLAPSIBLE TIRE RETREADING RIM
Jack H. Holmes, Parma Heights, Ohio, assignor to The James C. Heintz Company, Cleveland, Ohio, a corporation of Ohio
Filed Apr. 2, 1962, Ser. No. 184,170
10 Claims. (Cl. 156—417)

This invention relates in general to pneumatic tire retreading apparatus, and more particularly to a collapsible tire rim for use interiorly of a tire, and with mold mechanism, for retreading a tire.

Collapsible tire rims for use in retreading a tire are known in the tire retreading art, and may comprise rim sections hinged to one another for readily mounting of the rim interiorly of the tire, in the retreading operation on the tire. In prior art arrangements, after the retreading operation and during removal of the tire from the encompassing mold, the hinges and other "hardware" on the interiorly disposed rim, oftentimes came into contact with the interior side walls of the tire, especially adjacent the bead areas thereof, and cut or punctured the tire, thus rendering the retreaded tire useless.

The present invention provides a tire rim embodying means thereon for preventing the rim hinges and other hardware thereon, from contacting the inside of the tire, thereby eliminating the above discussed disadvantages of the prior art arrangements.

Accordingly, an object of the invention is to provide an improved tire rim for use in retreading a tire.

Another object of the invention is to provide a collapsible tire rim for use interiorly of a tire in conjunction with a tire retreading mold, and wherein the tire rim includes means on the interior circumference thereof, for preventing the hinges and locking mechanism of the tire rim from contacting the interior surface of the tire.

A more specific object of the invention is to provide a collapsible tire rim for use interiorly of the tire in conjunction with a tire retreading mold, and wherein the rim comprises a plurality of generally channel-shaped or inverted U-shaped sections (in cross section) hinged together on the interior surfaces thereof at the junctures of the rim sections, and icluding a coacting tongue and lug locking mechanism, for holding the tire rim in circular or non-collapsed condition, and wherein there is provided means in the form of inverted U-shaped or channel-shaped segments associated with each of the rim sections, for preventing the inside of a tire from contacting the hinges and locking hardware on the tire rim.

Other objects and advantages of the invention will be apparent from the following description taken in conjunction with the accompanying drawings, wherein:

FIG. 3 is a side elevational view of the tire rim of FIG. 1, with the latter being shown in collapsed condition;

Figure 1:
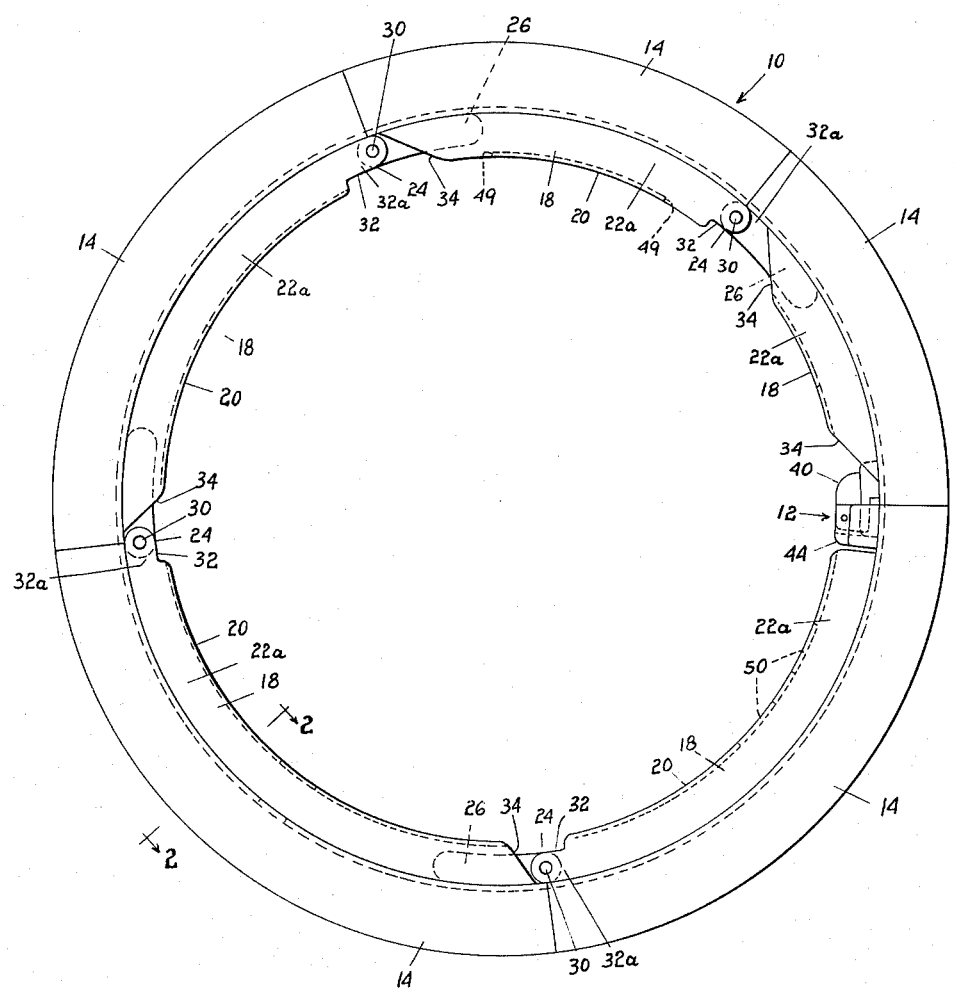
FIG. 1 is a side elevational view of a collapsible tire rim, for use in retreading a tire and embodying the invention of the instant application.
Figure 5:
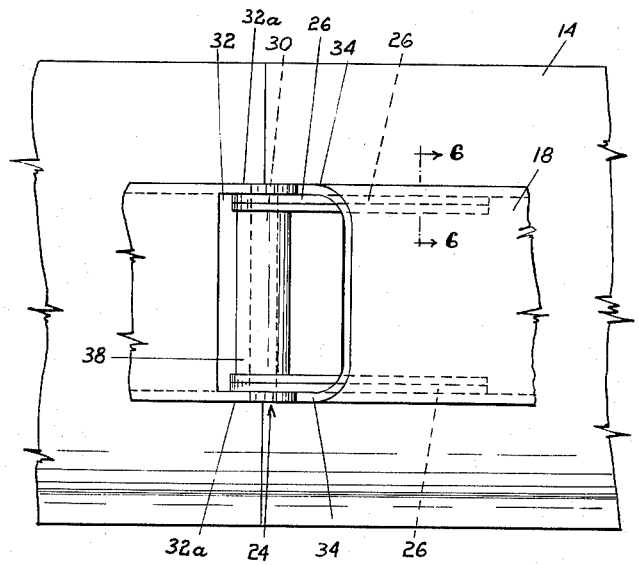
Figure 6:
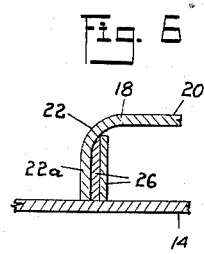
Figure 7:
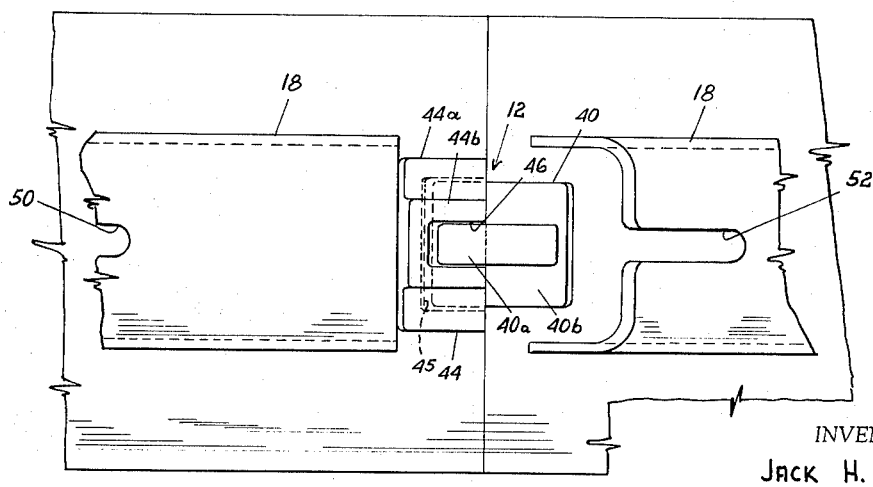

FIG. 4 is a fragmentary, side elevational view of a portion of the tire rim of FIG. 1, illustrating in particular the locking hardware on the rim for holding the rim in circular condition, and showing a tool for use with the rim, for deactivating the locking hardware, and permitting collapsing of the tire rim into the condition illustrated in FIG. 3; the phantom line showing in FIG. 4 illustrates the locked condition of the tire rim with the associated position of the tool for deactivating the locking hardware, while the full line position of FIG. 4 illustrates the separated or deactivated condition of the locking hardware and the associated position of the tool which accomplishes the deactivating of the locking hardware;

FIG. 5 is a fragmentary, enlarged top plan view of one of the hinged joints of the tire rim sections, which permits folding or collapsing of the tire rim into the condition illustrated in FIG. 3;

FIG. 6 is a fragmentary, sectional view taken generally along the plane of line 6—6 FIG. 5;

FIG. 7 is a fragmentary, top plan view of the locking hardware of the tire rim of the invention, with such hardware being shown in locking condition, for maintaining the tire rim in circular condition;

FIG. 8 is an enlarged, side elevational view of the lug portion of the locking hardware of the rim; and FIG. 9 is a top plan view of the lug portion of FIG. 8.

Referring now again to the drawings, there is illustrated a sectional tire rim 10 for use with a retreading mold of any suitable or conventional type, for retreading a tire. The rim 10 is adapted to be inserted interiorly of the tire in generally collapsed condition and then to be unfolded into its circular condition, and locked by means of locking mechanism or hardware 12, to positively maintain the circular condition of the tire rim.

Figure 2:
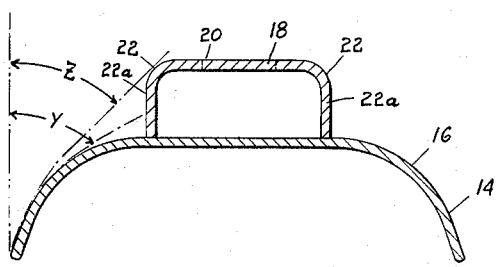
FIG. 2 is an enlarged, cross sectional view of the tire rim of FIG. 1, taken generally along the plane of line 2—2 of FIG. 1, looking in the direction of the arrows.

The rim 10 comprises a plurality of sections 14 of generally inverted U-shaped or channel-shaped configuration in cross section (as best shown in FIG. 2) and with such sections presenting smooth generally arcuate shaped surfaces 16 for preventing injury to the tire, when the interior of the tire engages such rim sections.

Now in accordance with the instant invention, each of the tire rim sections 14 is provided with an associated generally U-shaped or channel-shaped segment 18, attached as by means of welds or any other suitable means, to the interior surface 16 of the associated rim section. Each segment 18 is of a substantially lesser transverse width as compared to the width of its associated rim section as best illustrated in FIG. 2, and may comprise a generally planar top or inner surface 20 and smooth arcuate surfaces 22 merging with generally vertical side walls 22a. The rim sections and associated tire protector segments 18 are hinged together as at 24, to provide for collapsing of the tire rim into the condition illustrated, for instance, in FIG. 3, and thereby permit ready insertion of the rim into the interior of a tire to be retreaded.

Each hinge connection 24 may comprise brackets 26 suitably attached, preferably as by means of welds, to the interior of the associated side surface of the respective segment 18, with such brackets 26 projecting outwardly of the respective end of the associated segment 18, and being hinged or pivoted as by means of a pin 30 to the side walls 22a of the next adjacent segment 18. It will be seen that the hinge connections 24 are disposed radially outwardly (with respect to the tire rim) of the inner surface 20 of the associated tire protector segment 18, and in this connection, portions of the top and side walls of the segment are removed, as at 32, adjacent one end of each of the segments 18 to form laterally disposed ears 32a. Also, the other end of each segment 18 is tapered as at 34, to provide clearance between the adjacent segments when the tire rim is in folded or collapsed condition, as illustrated in FIG. 3. A spacer bushing 38 may be provided between the transversely spaced brackets 26 of each hinge 24, and in encompassing relation to the associated pin 30.

Referring now to the locking mechanism or hardware 12, the latter comprises a tongue portion 40 having a base 40a attached as by means of welds to the interior periphery of the associated rim section 14, and an upstanding rib or knife 40b projecting longitudinally outwardly from the associated end of the respective rim section 14, and adapted to be received in a lug portion 44, mounted on the confronting end of the next adjacent rim section. Lug 44 comprises a slotted base 44a (FIGS. 8 and 9) with the slot or recess 45 in said base 44a being formed generally complementary to the outwardly projecting base section 40a of the tongue portion 40 of the locking hardware, and having a generally upstanding substantially U-shaped section 44b, defining a slot 46 therein, which is adapted to receive the blade portion 40b of portion 40 of the locking hardware. U-shaped portion 44b and blade portion 40b are apertured, which apertures are adapted for alignment for receiving a locking pin therethrough, to positively hold the locking hardware in locked condition, and thereby maintain the tire rim in positive circular condition.

Referring now to FIGS. 1 and 3, the top or inner wall 20 of the protector segment 18 on the tire rim section adjacent to the rim section mounting locking blade 40, is cut back as at 49, so that the associated rim section may be disposed in close proximity to the lock mounting rim section in the collapsed condition of the rim, to form a highly compact arrangement, as is illustrated in FIG. 3. It will also be seen that the configuration of the rim sections 14 provide for close orientation of the rim sections with respect to one another, thereby adding to the compactness of the rim when the latter is in collapsed condition.

Referring now to FIG. 4, the rim sections are preferably so dimensioned that when they are in unfolded condition to form a circular rim, the locking hardware with the tongue portion 40 and the lug portion 44 are urged into coacting relationship with one another by the rim sections. In order to separate the locking hardware and deactivate such locking mechanism, there may be provided a linkage tool T comprising an arm $T_1$ pivoted to a second arm $T_2$. The rim section mounting the lug portion 44 of the locking hardware embodies openings 50 in the inner or top wall of the associated tire protecting segment 18, and wherein one of such openings 50 is adapted to receive therein leg $T_1$ of tool T, and the other leg $T_2$ of the tool abuts in a slot 52 formed in the inner or top wall of the tire protecting segment 18 associated with the rim section mounting the tongue portion 40 of the locking mechanism thereon. On forcing of leg $T_2$ counterclockwise (as viewed in FIG. 4), after removal of the pin locking the lug and tongue hardware together, the adjacent rim sections mounting the locking hardware 12 are forced away from one another to the full line positions illustrated in FIG. 4, and the locking mechanism is deactivated.

Another feature of the instant rim arrangement is that the tire protecting segments 18 on the interior circumference of the rim provide for additional "pull down" of the tire in the retreading operation on the tire. In the conventional retreading operation, the tire is inserted in the mold by first reducing its overall diameter by pressing of the beads of the tire together over the rim disposed interiorly of the tire, or in other words, in the cavity of the tire. In doing this, stock from the side walls of the tire is pulled into the general bead area, thereby reducing the diameter of the tire and facilitating its entry into the mold. The tire protecting segments on the interior circumference of the rim, makes it possible to increase this reduction of the area of the tire, because the angle of the "pull down" is reduced from approximately the angle Y shown in FIG. 2 to approximately the angle Z illustrated in FIG. 2, actually resulting in a greater reduction in the diameter of the tire and facilitating its being inserted into the mold. Accordingly, a somewhat larger tire can be reduced to go into a predetermined size of retreading mold or matrix as compared to that provided by a conventional retreading rim. It will be noted that all corners in the instant rim arrangement are well rounded to prevent any snagging of the tire's interior.

From the foregoing discussion and accompanying drawings, it will be seen that the invention provides a novel arrangement of high strength retreading rim or ring for use interiorly of a tire during a retreading operation, and one that embodies protecting means thereon for preventing injury to the interior walls of the tire especially during removal of the tire from the retreading mold.

The terms and expressions which have been used are used as terms of description and not of limitation, and there is no intention in the use of such terms and expressions of excluding any equivalents of any of the features shown, or described, or portions thereof, and it is recognized that various modifications are possible within the scope of the invention claimed.

I claim:

1. A collapsible tire rim for use in retreading a tire or the like, said rim comprising a plurality of elongated arcuate-like sections adapted to be disposed in abutting end-to-end relation to form a circular configuration in the expanded condition of said rim, hinge means connecting said rim sections together for collapsing the rim from said expanded condition, and a tire protector means including an elongated, generally arcuate-shaped segment mounted on the interior surface of each of said rim sections, said segments extending generally radially inwardly with respect to the associated rim section and projecting beyond the disposition of the hinge means on said rim sections to prevent damage to the tire from said hinge means.

2. A tire rim in accordance with claim 1, wherein two adjacent sections of said rim are non-hinged to one another, and including locking means on said two sections adapted for holding coaction, for retaining said rim in said circular configuration, said locking means being deactuatable to permit separation of said two sections and collapsing of said rim.

3. A tire rim in accordance with claim 1, wherein said segments are of generally U-shaped configuration in transverse cross section, said segments being of a lesser transverse width as compared to the width of the associated rim section.

4. A tire rim adapted for disposal interiorly of a tire during retreading thereof, said rim comprising a plurality of elongated, generally arcuate sections adapted to be disposed in abutting end-to-end relation to form a generally circular configuration in the expanded condition of said rim, hinge means pivotally connecting said rim sections together for collapsing the rim from said expanded condition, said hinge means being disposed on and extending from the interior circumference of said rim, locking means associated with two adjacent rim sections and adapted for detachably interlocking coaction for holding the rim sections in said expanded condition, and tire protector means including an elongated generally arcuate-shaped protector segment mounted on the interior surface of each of said rim sections, said protector segments extending generally inwardly with respect to the associated rim section and projecting beyond the disposition of the hinge means on said rim sections to prevent damage to the tire from said hinge means.

5. A tire rim in accordance with claim 4, wherein said locking means comprises a blade portion projecting generally longitudinally outwardly of one end of the respective rim section, and a lug portion on the confronting end of the adjacent of said two sections and having a recess therein adapted to receive said blade portion in holding coaction.

6. A tire rim in accordance with claim 5, wherein the rim section adjacent to and hinged to the rim section mounting said blade portion thereon includes means for providing close orientation of the last mentioned rim sections in the collapsed condition of the tire rim.

7. A tire rim in accordance with claim 4, including means on the respective segments of said two rim sections adapted for coaction with an associated tool, for forcing said two rim sections away from one another for deactivation of said locking means.

8. A tire rim in accordance with claim 4, wherein said protector segments adjacent said hinge means are tapered at the ends thereof so as to prevent interference between said hinge means and said protector segments upon collapsing of said tire rim.

9. A tire rim in accordance with calim 4, wherein each of said hinge means is formed by a plurality of laterally disposed flanges attached to the interior of the associated side surface respectively of each of each protector segments, and projecting outwardly of an end thereof, and the next adjacent protector segment is formed with ears at the confronting end thereof disposed in overlapping relation respectively with respect to each of said flanges, and a transverse pin extends through apertures in said flanges and said ears, to pivotally connect the adjacent rim sections together.

10. A collapsible tire rim for use in retreading tires or the like, said rim comprising a plurality of elongated, generally arcuate rim sections adapted to be disposed in abutting end-to-end relation to form a generally circular configuration in the expanded condition of the rim, hinge means pivotally connecting said rim sections together for collapsing the rim sections from said expanded condition, said hinge means being disposed on the interior circumference of said rim, and tire protector means including elongated, generally inverted U-shaped, channel-like segments fixedly mounted on the interior surface of each of said rim sections, said channel-like segments having a smooth exterior surface and being of a lesser transverse width as compared to the width of its associated supporting rim section but wider as compared to the hinge means, and all of said channel-like segments extending generally radially inwardly with respect to the associated rim sections and projecting inwardly a greater distance than the corresponding extent of projection of said hinge means to define a common, generally circumferential protector surface above said hinge means.

References Cited by the Examiner
UNITED STATES PATENTS

| | | | |
|---|---|---|---|
| 1,650,147 | 11/27 | Morris | 156—417 |
| 1,948,035 | 2/34 | Johnson | 156—417 |

ALEXANDER WYMAN, *Primary Examiner.*

HAROLD ANSHER, *Examiner.*